T. M. & W. DAVIES.
MEANS FOR PREVENTING AN AUXILIARY WHEEL CREEPING.
APPLICATION FILED SEPT. 3, 1907.
913,704.
Patented Mar. 2, 1909.
2 SHEETS—SHEET 1.
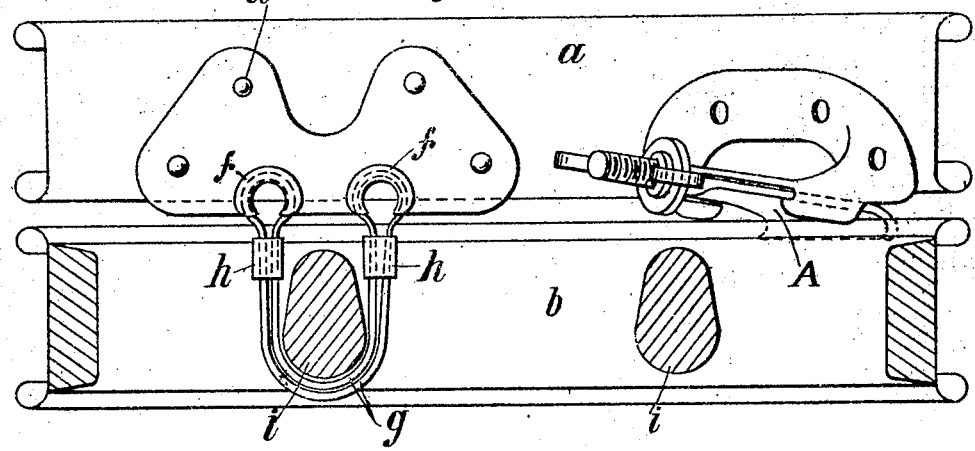
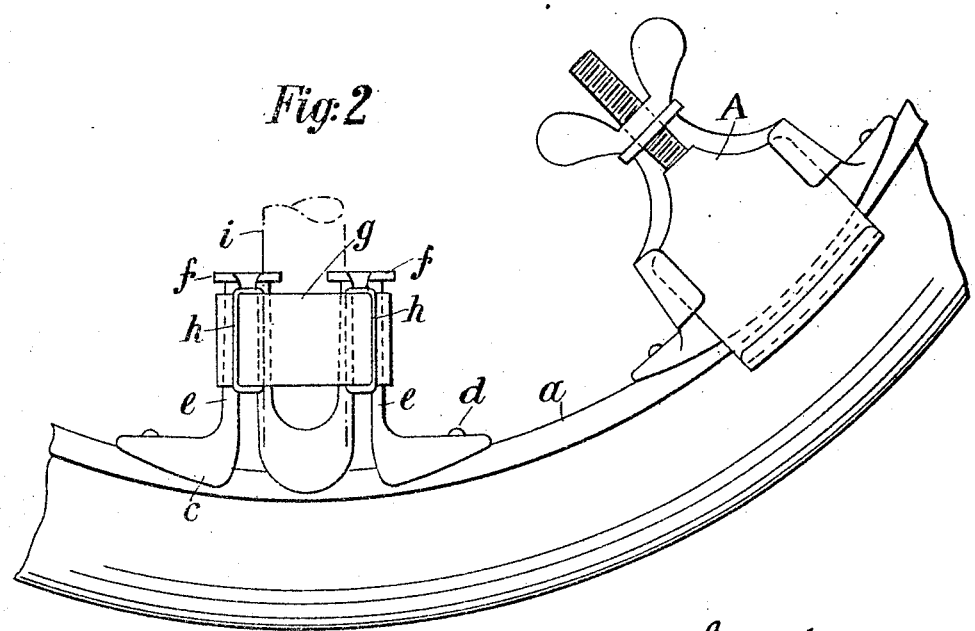

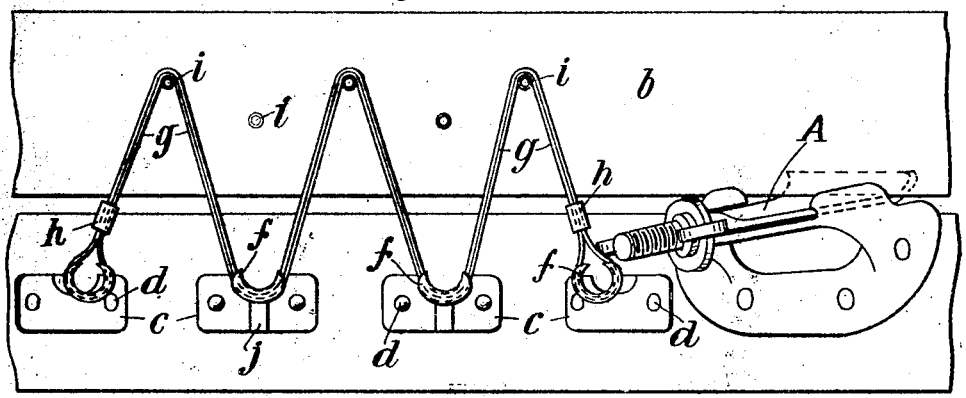
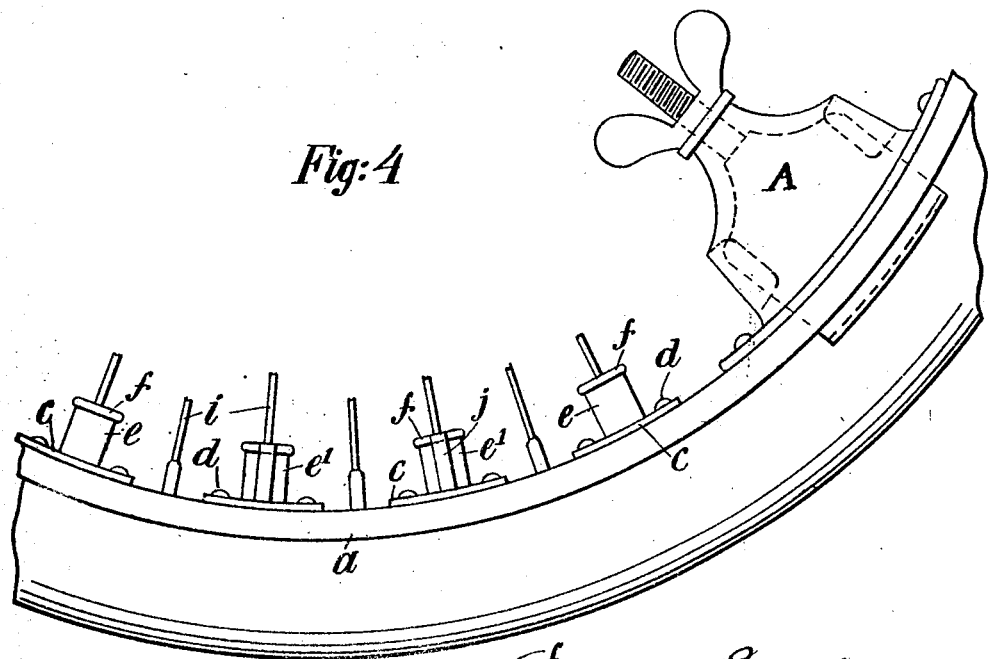

UNITED STATES PATENT OFFICE.

THOMAS M. DAVIES AND WALTER DAVIES, OF LLANELLY, ENGLAND, ASSIGNORS TO STEPNEY SPARE MOTOR WHEEL, LIMITED, OF LLANELLY, ENGLAND.

MEANS FOR PREVENTING AN AUXILIARY WHEEL CREEPING.

No. 913,704.      Specification of Letters Patent.      Patented March 2, 1909.

Application filed September 3, 1907. Serial No. 391,117.

*To all whom it may concern:*

Be it known that we, THOMAS M. DAVIES and WALTER DAVIES, subjects of the King of Great Britain, residing at Llanelly, Wales, Great Britain, have invented new and useful Improvements in Means for Preventing an Auxiliary Wheel Creeping, of which the following is a specification.

The invention relates to auxiliary wheels consisting of a rim, an inflated or other tire located in said rim, and means such as the clips, shown in specification of United States Patent No. 895,975, for attaching the auxiliary rim to the side of the rim of a motor car wheel when the tire on this last mentioned wheel is punctured or otherwise injured.

Heretofore in order to prevent circumferential motion or creeping between the auxiliary wheel and the car wheel, a fork carried by the auxiliary rim has engaged with a spoke of the car wheel, but such forks are liable to injure the appearance of the spokes.

According to the present invention we form the auxiliary rim with two radial posts and pass the ends of a flattened endless strap around said posts and the flattened or double part around one or more spokes. Such strap is provided with loops or rings to tighten its ends over the two posts, or two end posts when more than two posts are employed.

The invention is illustrated in the accompanying drawings, in which—

Figure 1 is a plan of part of a car wheel and part of an auxiliary wheel, showing the auxiliary wheel attached to the side of a wooden or artillery car wheel. Fig. 2 is a side elevation of parts of the auxiliary wheel only shown at Fig. 1. Fig. 3 is a plan of part of a motor car wheel having wire spokes with an auxiliary wheel attached thereto. Fig. 4 is a side elevation of the parts shown in Fig. 3, but with the strap omitted. Fig. 5 is a detail view of one of the radial posts shown at Figs. 3 and 4.

As shown in Figs. 1 and 2, *a* is the auxiliary rim, which is attached by suitable means to the side of the car wheel rim *b*. Such means of attachment A form no part of the present invention and the means here shown are fully described in the specification of the aforesaid United States Patent No. 895,975. *c* is a cast or stamped base plate which is fixed to the auxiliary rim *a* by the rivets *d* or otherwise. Such casting or stamping *c* is provided with two radial posts *e* each provided with a flange *f*. In conjunction with these radial posts *e*, we employ an endless doubled strap *g* made of leather or other suitable pliable material, and such strap carries two sliding rings *h* by which it is fixed on to the posts *e* when the auxiliary wheel *a* is first attached to the car wheel *b*. After the auxiliary wheel *a* has crept slightly the endless strap *g* becomes tight around the spoke *i* and the posts *e* and is then held in position by friction and by the flanges *f*. In Fig. 2 the position of the spoke *i* is only shown by dotted lines. One end of the endless strap *g* which forms a loop, is placed in position over one of the radial posts *e* and the nearest ring *h* is pushed towards the posts *e*, thereby closing the looped end of the strap *g* tightly around the post *e*. The endless strap *g* is then passed around a spoke *i* and the other looped end is then passed over a second post *e* and the other ring *h* is moved towards the post to close the loop.

In the modification shown at Figs. 3, 4 and 5, the endless strap *g* is longer than in the form shown in Figs. 1 and 2, and the auxiliary rim is provided with two radial posts *e* each having a flange *f*, but the posts are arranged at a greater distance apart and on separate base plates. In this modification there are other posts *e'* intermediate of the end posts *e*. These posts *e'* may each have its flange *f* connected to the base of the part *c* by a web *j* to form an eye at their back so that the endless strap *g* may be passed therethrough and may thus be more securely held in position. The strap *g* is fixed on one end post *e* by sliding the ring *h* into position and is passed to and fro around the spokes *i* and the posts *e'* and is finally fixed to the last post by sliding the ring *h* into position near to the post.

We claim:

1. In an auxiliary wheel, the combination of a rim, means for fixing the same laterally to a car wheel, posts permanently fixed to and projecting radially from said rim, a strap on said posts adapted to engage a spoke of the car wheel, and a flange on the inner end of each post adapted to retain the strap in position, substantially as herein shown and described.

2. In an auxiliary wheel, the combination of a rim, means for fixing the same laterally to a car wheel, base plates fixed to said rim, radially extending posts carried by the base plates, a strap on said posts adapted to engage a spoke of the car wheel, and a flange carried at the inner end of each post to retain the strap in position, substantially as set forth.

3. In an auxiliary wheel, the combination of a rim, means for fixing the same laterally to a car wheel, posts projecting radially from the rim, a flange on the inner end of each post, an endless strap forming a flattened loop adapted to engage a spoke of the car wheel, the ends of which loop are located on the end posts, and rings on said strap to retain the flattened condition of said strap and thus hold this latter in position on said end posts, substantially as set forth.

4. In an auxiliary wheel, the combination of a rim, means for fixing the same laterally to a car wheel, a plurality of radial posts all provided with a flange and those intermediate of the end posts having the flange connected to the auxiliary rim to form an eye, and an endless strap adapted to engage the car wheel and passed around the end radial posts and through the said eyes and rings on the endless strap by which it is tightened over the end posts, substantially as set forth.

In witness whereof we have hereunto set our hands in presence of two witnesses.

THOMAS M. DAVIES.
WALTER DAVIES.

Witnesses:
CLAUDE K. MILLS,
RADFORD TOOKE.